United States Patent
Wu et al.

(10) Patent No.: US 12,478,253 B2
(45) Date of Patent: Nov. 25, 2025

(54) RETINAL CAMERA WITH SELECTIVE ILLUMINATION BANDS

(71) Applicant: Verily Life Sciences LLC, Dallas, TX (US)

(72) Inventors: Honglei Wu, South San Francisco, CA (US); Sam Kavusi, Menlo Park, CA (US)

(73) Assignee: Verily Life Sciences LLC, Dallas, TX (US)

( * ) Notice: Subject to any disclaimer, the term of this patent is extended or adjusted under 35 U.S.C. 154(b) by 762 days.

(21) Appl. No.: 17/641,983

(22) PCT Filed: Sep. 23, 2020

(86) PCT No.: PCT/US2020/052184
§ 371 (c)(1),
(2) Date: Mar. 10, 2022

(87) PCT Pub. No.: WO2021/076283
PCT Pub. Date: Apr. 22, 2021

(65) Prior Publication Data
US 2023/0144782 A1    May 11, 2023

Related U.S. Application Data

(60) Provisional application No. 62/915,114, filed on Oct. 15, 2019.

(51) Int. Cl.
*A61B 3/14* (2006.01)
*A61B 3/12* (2006.01)
(Continued)

(52) U.S. Cl.
CPC .............. *A61B 3/14* (2013.01); *A61B 3/12* (2013.01); *A61B 3/18* (2013.01); *H04N 23/15* (2023.01); *H04N 23/56* (2023.01)

(58) Field of Classification Search
CPC .. A61B 3/12; A61B 3/14; A61B 3/156; A61B 3/0008; A61B 3/1208;
(Continued)

(56) References Cited

U.S. PATENT DOCUMENTS

| 7,854,510 B2 | 12/2010 | Verdooner et al. |
| 8,406,859 B2 | 3/2013 | Zuzak et al. |

(Continued)

FOREIGN PATENT DOCUMENTS

| JP | 2006239100 A | 9/2006 |
| WO | 2004021050 A2 | 3/2004 |
| WO | 2019172206 A | 2/2021 |

OTHER PUBLICATIONS

Japanese Office Action, mailed Jan. 22, 2023, in corresponding Japanese Patent Application No. 2022-517293, 4 pages.
(Continued)

*Primary Examiner* — Brandi N Thomas
(74) *Attorney, Agent, or Firm* — Christensen O'Connor Johnson Kindness PLLC

(57) ABSTRACT

A technique for imaging a retina with a retinal camera includes illuminating the retina with a plurality of distinct illumination bands that are substantially exclusive of green visible light while substantially not illuminating the retina with the green visible light. A first retinal image is acquired while illuminating the retina with the distinct illumination bands and substantially not illuminating the retina with the green visible light.

10 Claims, 4 Drawing Sheets

(51) Int. Cl.
*A61B 3/18* (2006.01)
*H04N 23/15* (2023.01)
*H04N 23/56* (2023.01)

(58) Field of Classification Search
CPC ..... A61B 3/0025; A61B 3/0091; A61B 3/113; A61B 3/18; A61B 2560/0431; A61B 3/005; A61B 3/0058; A61B 3/10; A61B 3/13; A61B 3/145; A61B 5/6803; A61B 5/7267; A61B 2017/00725; A61B 1/00163; A61B 1/00195; A61B 1/00197; A61B 1/00186; A61B 1/06; A61B 1/0627; A61B 1/0625; A61B 1/0623; A61B 1/0615; A61B 1/0607; A61B 1/0605; A61B 1/063; A61B 1/0638; A61B 3/00; G02B 26/00; G02B 6/0001; G02B 1/045

See application file for complete search history.

(56) References Cited

U.S. PATENT DOCUMENTS

| | | | |
|---|---|---|---|
| 8,807,751 | B2 | 8/2014 | Kahn et al. |
| 10,115,194 | B2 | 10/2018 | Niemeijer et al. |
| 2009/0153798 | A1 | 6/2009 | Dick et al. |
| 2010/0328606 | A1* | 12/2010 | Peyman ............... A61B 3/102 351/206 |
| 2012/0327368 | A1 | 12/2012 | Williams et al. |
| 2013/0033593 | A1* | 2/2013 | Chinnock ............ A61B 3/14 348/78 |
| 2015/0002817 | A1 | 1/2015 | Alasaarela et al. |
| 2017/0007121 | A1 | 1/2017 | Gruppetta |
| 2017/0095152 | A1 | 4/2017 | Yates et al. |
| 2018/0075628 | A1* | 3/2018 | Teare ............. G06F 18/24143 |
| 2020/0129062 | A1* | 4/2020 | Glik ................... A61B 3/0091 |

OTHER PUBLICATIONS

International Search Report and Written Opinion, mailed Jan. 29, 2021, in corresponding International Patent Application No. PCT/US2020/052184, 10 pages.

Porter, What is Fluorescein Angiography?, American Academy of Ophthalmology, https://www.aao.org/eye-health/treatments/what-is-fluorescein-angiography, Eye Health/Eye Health A-Z, Dec. 14, 2018, 5 pages.

Zimmer et al., Innovation in Diagnostic Retinal Imaging: Multispectral Imaging, Multiple-wavelength imaging of the retina and choroid, Retina Today, Oct. 2014, 6 pages.

Extended European Search Report and Search Opinion, mailed Jul. 6, 2023, in corresponding European Patent Application No. 20877976.9, 7 pages.

* cited by examiner

RETINAL CAMERA WITH SELECTIVE ILLUMINATION BANDS

CROSS-REFERENCE TO RELATED APPLICATIONS

This application is a 371 National Stage of International Application No. PCT/US2020/052184 filed on Sep. 23, 2020, which claims priority to and benefit of U.S. Provisional Application No. 62/915,114, filed on Oct. 15, 2019, the content of which is hereby incorporated by reference in its entirety.

TECHNICAL FIELD

This disclosure relates generally to retinal imaging technologies, and in particular but not exclusively, relates to illumination techniques for retinal imaging.

BACKGROUND INFORMATION

Retinal imaging is a part of basic eye exams for screening, field diagnosis, and progress monitoring of many retinal diseases. A high fidelity retinal image is important for accurate screening, diagnosis, and monitoring. Bright illumination of the posterior interior surface of the eye (i.e., retina) through the pupil improves image fidelity but is known to be uncomfortable to the patient.

Camera alignment is very important, particularly with conventional retinal cameras, which typically have a very limited eyebox due to the need to block the deleterious image artifacts that occur when the retinal camera is misaligned to the patient's eye. The eyebox for a retinal camera is a three dimensional region in space typically defined relative to an eyepiece of the retinal camera and within which the center of a pupil or cornea of the eye should reside to acquire an acceptable image of the retina. The small size of conventional eyeboxes makes retinal camera alignment difficult and patient interactions during the alignment process often strained.

Patients need to keep their heads absolutely still during the retinal imaging process. Their pupils are typically dilated with drops, or dark-adapted so that the pupil naturally dilates. With the pupil in the dilated state, or dark-adapted, a strong white light flash is activated. This sudden flash of bright visible light into the dilated or dark-adapted eyes can cause a high amount of discomfort or stress, which in turn often causes the patient to recoil or move. As such, conventional retinal imaging systems may only get a single retinal image capture per lengthy alignment episode, which can extend the overall imaging process when multiple retinal images are desired.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1:
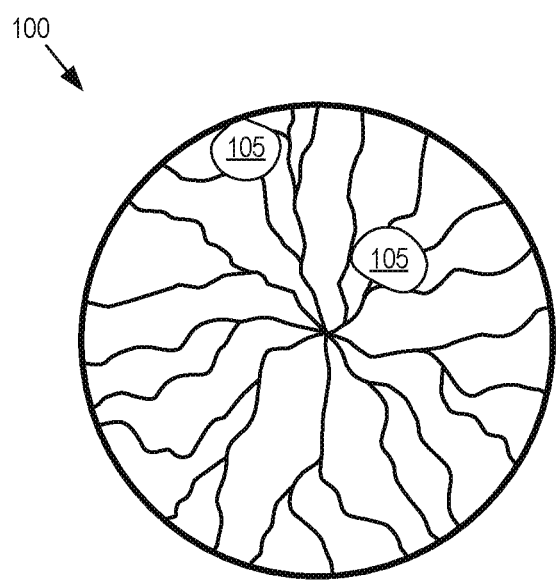
FIG. 1 illustrates a retinal image including an image artifact.

Embodiments of a system, apparatus, and method for selectively illuminating a retina with a multiband illuminator during retinal imaging are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Conventional retinal (of fundus) cameras are known to be uncomfortable for the patient, and at the same time, provide only low throughput capacity as only a single retinal image is acquired for each flash illumination with a bright white illumination source. The discomfort associated with retinal imaging is one reason why patients are not enthusiastic about having their retinal images taken. Embodiments disclosed herein alleviate the discomfort concerns and low throughput capacity using a multiband illuminator. In one embodiment, a plurality of distinct illumination bands including visible light wavelengths substantially devoid of green visible light is used to illuminate the retina during image capture. Because the photoreceptors in the human eye are particularly sensitive to green light, embodiments disclosed herein use illumination that is substantially devoid of green light to enable longer illumination windows (relative to what a patient can tolerate with white light illumination that includes green wavelengths) during which there is sufficient exposure time to acquire a burst of retinal images.

In one embodiment, multiband illumination substantially devoid of green visible light is used to illuminate the patient's retina while the retinal imaging system is being aligned to the user's eye. During this alignment period, the burst of retinal images (e.g., multiband images) may be acquired by the retinal imaging system. Upon determining that threshold alignment has been achieved between the retinal camera system and the user's eye, the retina may be flashed with white light illumination, including green visible light, to acquire a full color image. With white light flash illumination, there may only be sufficient exposure time (before the patient recoils) to acquire a single full color image, or at least a comparatively low number of images relative to multiband illumination substantially devoid of green visible light.

The above described technique facilitates acquisition of a dataset including multiple image acquisitions (including multiband images substantially devoid of green visible light and optionally one or more full color images including green visible light) per setup and alignment. Various image manipulation techniques may then be used to combine the dataset into a composite image for reviewing by a doctor or technician. For example, the multiband images may be converted to RGB false images for review, or combined with the full color images to obtain high quality/fidelity, low artifact, multispectral retinal images. Alternatively (or additionally), machine learning techniques may be applied to classify the dataset and provide an indication of whether the patient is symptomatic of one or more ocular diseases.

High fidelity retinal images are important for screening, diagnosing, and monitoring many retinal diseases. To this end, obtaining as many retinal images as feasible in an allocated period of time that the patient is willing to tolerate improves image fidelity and reduces or eliminates image artifacts that occlude, or otherwise malign portions of the retinal image is desirable. FIG. 1 illustrates an example retinal image 100 with multiple image artifacts 105. These image artifacts may arise when misalignment between the retinal imaging system and the eye permit stray light and deleterious reflections from the illumination source to enter the image path and ultimately are captured by the image sensor with the retinal image light. Misalignment can lead to deleterious corneal/iris reflections, refractive scattering from the crystalline lens, and occlusion of the imaging aperture. Since achieving alignment, within threshold tolerances, can be time consuming, the more retinal images that can be acquired per setup and alignment, the better.

Figure 2:
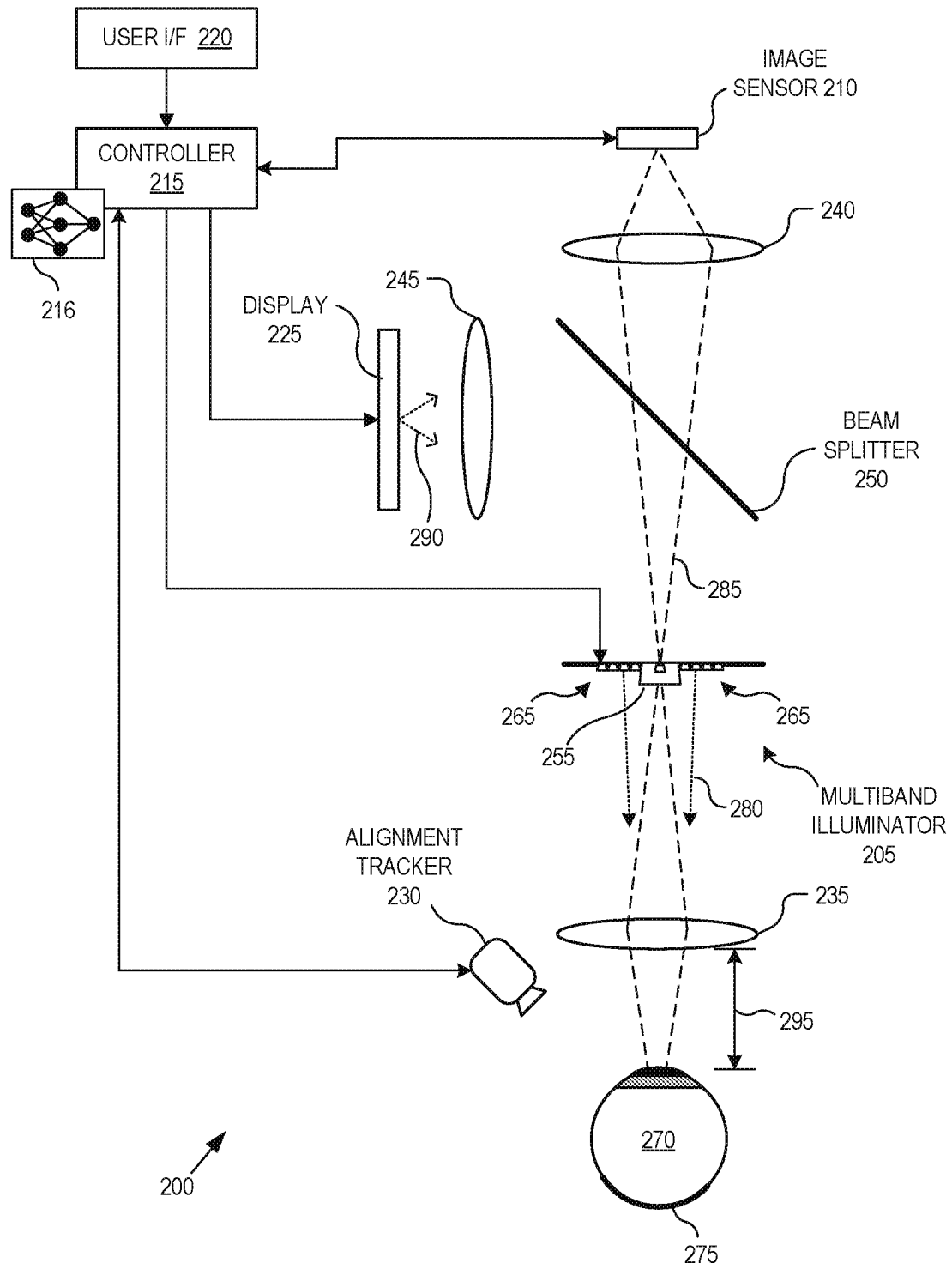
FIG. 2 illustrates a retinal imaging system with a multi-band illuminator, in accordance with an embodiment of the disclosure.

FIG. 2 illustrates a retinal imaging system 200 with a multiband illuminator, in accordance with an embodiment of the disclosure. The illustrated embodiment of retinal imaging system 200 includes a multiband illuminator 205, an image sensor 210 (also referred to as a retinal camera sensor), a controller 215, a user interface 220, a display 225, an alignment tracker 230, and an optical relay system. The illustrated embodiment of the optical relay system including lenses 235, 240, 245 and a beam splitter 250. The illustrated embodiment of dynamic illuminator 205 includes a center aperture 255 and illumination sources 265 extending peripherally around center aperture 255. It should be appreciated that retinal imaging system 200 is merely a demonstrative example for implementing the techniques described herein. It is anticipated that the multiband imaging techniques disclosed herein may be implemented with a variety of different retinal or fundus imaging architectures beyond that described herein.

The optical relay system serves to direct (e.g., pass or reflect) illumination light 280 output from multiband illuminator 205 along an illumination path through the pupil of eye 270 to illuminate retina 275 while also directing image light 285 of retina 275 (i.e., the retinal image) along an image path to image sensor 210. Image light 285 is formed by the scattered reflection of illumination light 280 off of retina 275. In the illustrated embodiment, the optical relay system further includes beam splitter 250, which passes at least a portion of image light 285 to image sensor 210 while also directing display light 290 output from display 225 to eye 270. Beam splitter 250 may be implemented as a polarized beam splitter, a non-polarized beam splitter (e.g., 90% transmissive and 10% reflective, 50/50 beam splitter, etc.), a dichroic beam splitter, or otherwise. The optical relay system includes a number of lenses, such as lenses 235, 240, and 245, to focus the various light paths as needed. For example, lens 235 may include one or more lensing elements that collectively form an eyepiece that is displaced from the cornea of eye 270 by an eye relief 295 during operation. Lens 240 may include one or more lens elements for bring image light 285 to a focus on image sensor 210. Lens 245 may include one or more lens elements for focusing display light 290. It should be appreciated that optical relay system may be implemented with a number and variety of optical elements (e.g., lenses, reflective surfaces, diffractive surfaces, etc.).

In one embodiment, display light 290 output from display 225 is a fixation target or other visual stimuli. The fixation target not only can aid with obtaining alignment between retinal imaging system 200 and eye 270 by providing visual feedback to the patient, but may also give the patient a fixation target upon which the patient can accommodate their vision. Display 225 may be implemented with a variety of technologies including an liquid crystal display (LCD), light emitting diodes (LEDs), various illuminated shapes (e.g., an illuminated cross or concentric circles), or otherwise.

Controller 215 is coupled to image sensor 210, display 225, multiband illuminator 205, and alignment tracker 230 to choreograph their operation. Controller 215 may include software/firmware logic executing on a microcontroller, hardware logic (e.g., application specific integrated circuit, field programmable gate array, etc.), or a combination of software and hardware logic. Although FIG. 2 illustrates controller 215 as a distinct functional element, the logical functions performed by controller 215 may be decentralized across a number hardware elements. Controller 115 may further include input/output (I/O ports), communication systems, memory, data storage, or otherwise. Controller 215 is coupled to user interface 220 to receive user input and provide user control over retinal imaging system 200. User interface 220 may include one or more buttons, dials, feedback displays, indicator lights, etc.

Controller 215 may further devote compute resources to post image processing. This processing may include combining (or image stacking) multiple retinal images acquired with various different spectral band illumination into a single composite image. Furthermore, controller 215 may convert retinal images acquired with distinct illumination bands that exclude green visible wavelengths into RGB false color images. In one embodiment, controller 215 may include a neural network trained using full color RGB images associated with multiband images acquired with distinct illumination bands substantially devoid of green visible light to perform the conversion to RGB false color images. In yet other embodiments, controller 215 may include a machine learning (ML) classifier 216 that classifies whether retinal images are symptomatic of one or more diseases. The neural network of ML classifier 216 may be trained with labeled image data acquired with distinct illumination bands substantially devoid of green visible light.

Image sensor 210 may be implemented using a variety of imaging technologies, such as complementary metal-oxide-semiconductor (CMOS) image sensors, charged-coupled device (CCD) image sensors, or otherwise. In one embodiment, image sensor 210 includes an onboard memory buffer or attached memory to store retinal images.

Alignment tracker 230 operates to track alignment between retinal imaging system 200 and eye 270. Alignment tracker 230 may operate using a variety of different techniques to track the relative positions of eye 270 and retinal imaging system 200 including pupil tracking, retina tracking, iris tracking, or otherwise. In one embodiment, alignment tracker 230 includes one or more infrared (IR) emitters to track eye 270 via IR light while retinal images are acquired with visible spectrum light and/or IR light. In such an embodiment, IR filters may be positioned (or selectively positioned) within the image path to filter the IR tracking light. In other embodiments, the tracking illumination is temporally offset from image acquisition. In some embodiments, image sensor 210 may also acquire IR images.

During operation, controller 115 operates multiband illuminator 205 and image sensor 210 to capture one or more retinal images. Multiband illuminator 205 is dynamic in that its illumination wavelengths, and optionally its physical illumination patterns, are not static; but rather, are dynamically changed under the influence of controller 215 based upon the determined alignment with eye 270 or based upon other factors. Illumination light 280 is directed through the pupil of eye 270 to illuminate retina 275. The scattered reflections from retina 275 are directed back along the image path through center aperture 255 to image sensor 210. The stop around center aperture 255 operates to block deleterious reflections and light scattering that would otherwise malign the retinal image while center aperture 255 passes the image light itself. The illumination patterns and wavelengths output by multiband illuminator 205 are selected based upon the current alignment (or lack thereof) and/or according to a predetermined sequence. The pattern of illumination may also be selected to reduce image artifacts arising from scattering off of the human lens within eye 270, reflections from the cornea/iris, or even direct specular reflections of illumination light 280 from retina 275. Direct specular reflections from retina 275 or the cornea/iris can create washed out regions (e.g., image artifacts 105) in the retinal image. The dynamic changes in the illumination patterns output from multiband illuminator 205 can serve to direct these specular reflections off axis from the image path and therefore blocked by the field stop around center aperture 255.

Figure 3:
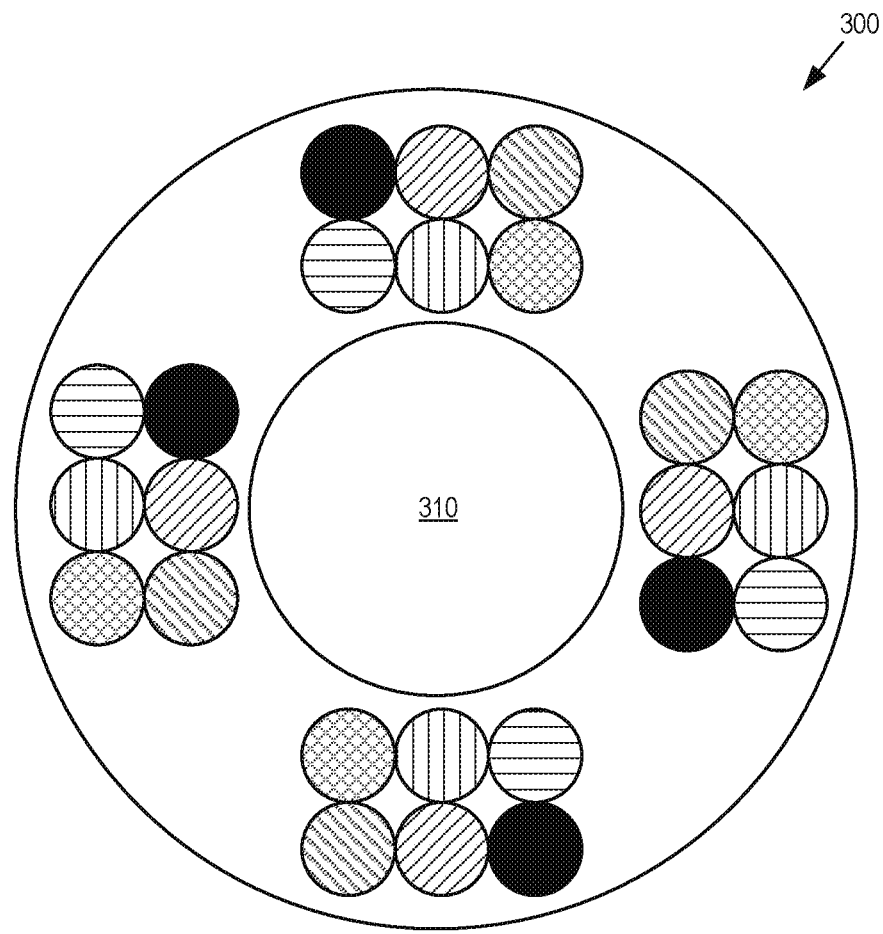
FIG. 3 illustrates a demonstrative multiband illuminator having a plurality of discrete illuminator sources spread peripherally around a central aperture, in accordance with an embodiment of the disclosure.
Figure 3:
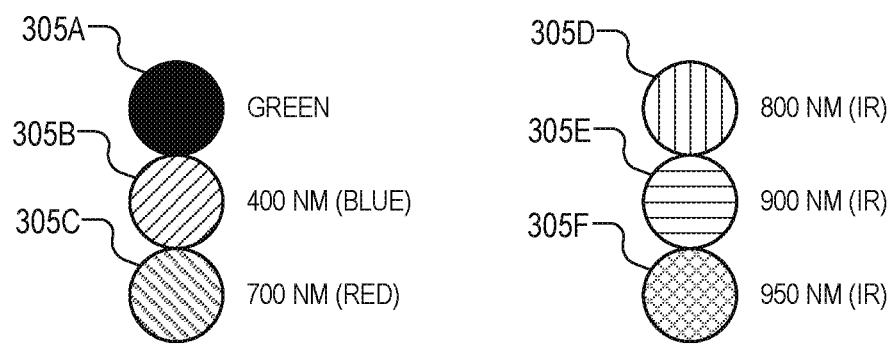

FIG. 3 illustrates a demonstrative multiband illuminator 300 having a plurality of discrete illuminator sources 305A-F (collectively referred to as sources 305) spread peripherally around a central aperture 310, in accordance with an embodiment of the disclosure. The illustrated embodiment of multiband illumination 300 is one possible implementation of multiband illuminator 205 illustrated in FIG. 2. However, it should be appreciated that multiband illuminator 300 is merely demonstrative and other physical layouts, wavelength bands, types of illuminator sources, etc. may be used.

Multiband illuminator 300 facilitates the use of multiple different spectral illumination bands that avoid the highly uncomfortable band of green visible light. The human eye is most sensitive to visible light around the "green" band of visible colors (e.g., wavelengths corresponding approximately to the range of 500 nm to 600 nm). By avoiding green visible light, at least initially during the imaging process, patient discomfort can be reduced or at least delayed until the end of the imaging procedure. The reduction in discomfort while illuminating the human eye with illumination substantially devoid of green visible light enables the patient to tolerate longer illumination and exposure windows facilitating capture of a greater number of retinal images for each alignment cycle. The phrase "substantially devoid" is used herein to mean that the illumination need not be 100% devoid of green wavelength components, but rather the green wavelength components (e.g., 500 nm to 600 nm) are sufficiently suppressed relative to the other illumination wavelength components so as not to evoke a noticeable physiologic response (e.g., patient recoils or experiences noticeable discomfort) due to any green light spectral remnants.

In the illustrated embodiment, multiband illuminator 300 includes five distinct illumination bands that are substantially devoid of green visible light, corresponding to discrete illuminator sources 305B-F. For example, discrete illuminator sources 305B-F include a blue light source (discrete illuminator sources 305B), a red light source (discrete illuminator sources 305C), and infrared sources (discrete illuminator sources 305D-F). The illustrated embodiment of multiband illuminator 300 also includes a green light source 305A (e.g., 500-600 nm). Green light source 305A may be illuminated with a combination of the other non-green sources, such as discrete illuminator source 305B (blue light) and discrete illuminator source 305C (red light) to form a white light illumination pattern. Alternatively, multiband illuminator 300 may also include a discrete white light source (e.g., blue LED with one or more phosphorus layers) or replace green discrete illuminator source 305A with a discrete white light source. In yet other embodiments, multiband illuminator 300 may be a dynamic spectral source capable of tuning its spectral output using a variety of techniques including tunable wavelength sources, tunable wavelength filters, combinations thereof, or otherwise.

The illustrated embodiment of FIG. 3 includes five distinct illumination bands that are substantially devoid of green visible light but include the following wavelengths: 400 nm, 700 nm, 800 nm, 900 nm, and 950 nm. Of course, other combinations of non-green wavelengths with more than five or fewer than five distinct wavelength bands may be used and/or implemented. The distinct illumination bands have distinct central wavelengths (e.g., where peak spectral power is emitted), but may have various bandwidths (e.g., ±10 nm, ±15 nm, ±20 nm, etc.). The distinct illumination bands may be defined by their respective 3 dB points (half-power points), full width half max (FWHM) bands, or otherwise. The distinct illumination bands may be non-overlapping wavelength bands or overlapping wavelength bands. Although FIG. 3 illustrates the use of distinct illumination sources, one or more tunable sources may be implemented in place of or along with the discrete illumination sources. While FIG. 3 illustrates the five discrete illumination source types along with a green illumination source type arranged into four quadrant clusters spread peripherally about center aperture 310, other layout patterns having more or less instances of discrete illumination sources for each wavelength band may be implemented.

These distinct illumination bands may all be flashed or illuminated contemporaneously, in a non-contemporaneous but sequential pattern, or in various sub-combinations thereof to obtain various multiband (e.g., multispectral) images. By flashing discrete illuminators sources 305A-C (or a distinct white light source instead), one or more full color images may be selectively acquired. By illuminating various combinations of the non-green illumination sources (e.g., 305B-F), multiband images substantially devoid of green visible light may be selectively acquired.

In one embodiment, image sensor 210 and multiband illuminator 205 (or 300) may be operated under the influence of controller 215 to continuously capture retinal images at a high frame rate (e.g., 30 frames/sec) as the patient is sitting in front of retinal camera system 200. This high frame rate image capture may continue for a period of time (e.g., 10 seconds), continue until controller 215 deems alignment has been achieved, continue until a enough good quality images covering desired portions of the retina have been acquired, or otherwise. Controller 215 may use retinal tracking via image sensor 210 to determine eye alignment and/or eye tracking (e.g., pupil or iris tracking) via external alignment tracker 230. In one embodiment, multiband images substantially devoid of green visible light are continuously acquired until alignment is determined, at which point controller 215 flashes retina 275 with white light to acquire a full color image. The many multiband images that are acquired may then be analyzed (e.g., via a software algorithm or human operator) to select a number of good retinal image frames.

Figure 4:
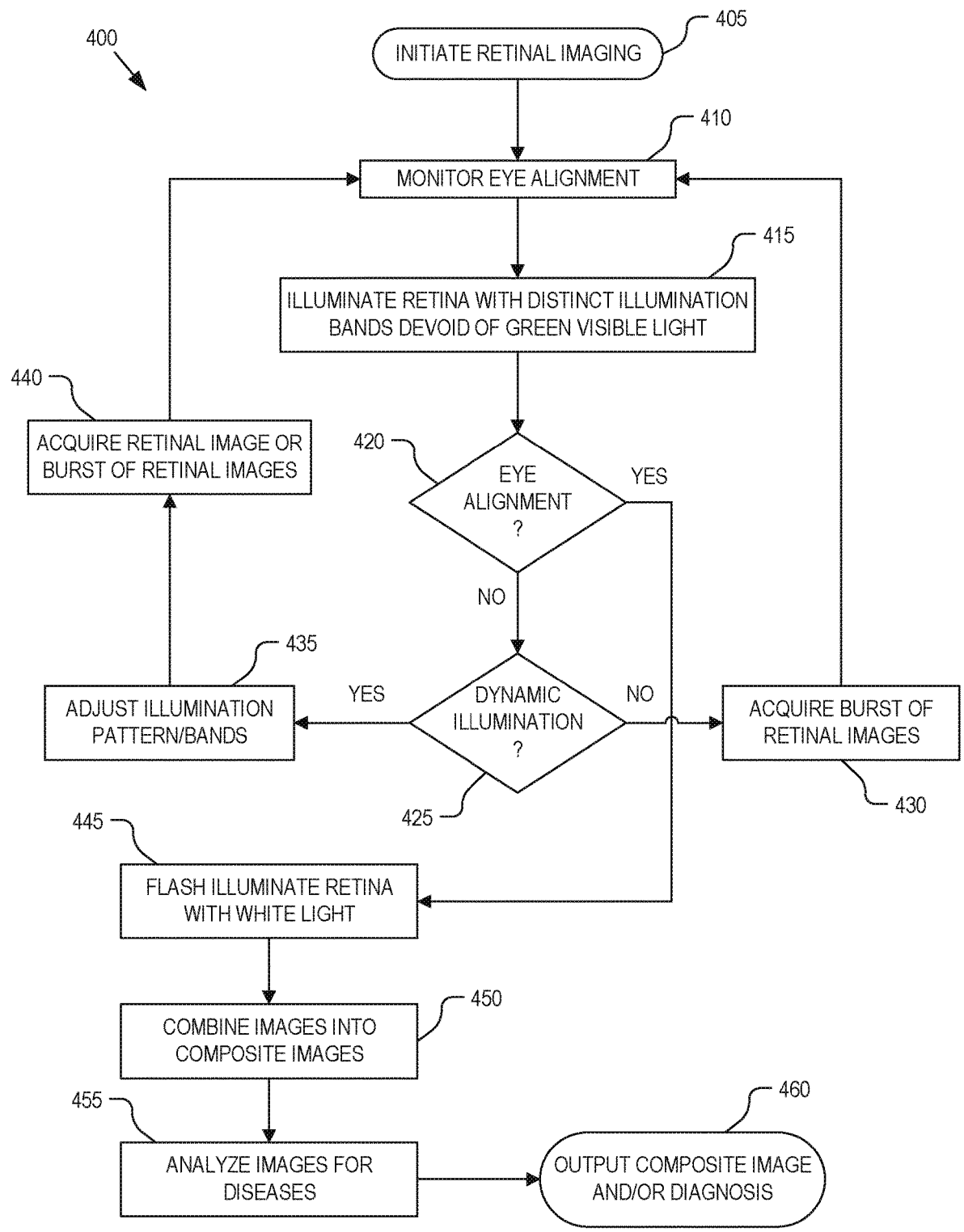
FIG. 4 is a flow chart illustrating operation of a retinal imaging system using a multiband illuminator, in accordance with an embodiment of the disclosure.

FIG. 4 is a flow chart illustrating a process 400 of operation for retinal imaging system 200 using multiband illuminator 300 (or 205), in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

In a process block 405, imaging of retina 275 is commenced. Initiation may begin when the patient's eye is placed in front of eyepiece lens 235 and/or upon selection of an initiation command (e.g., start button or capture button). In a process block 410, controller 215 begins monitoring the patient's eye alignment. As mentioned above, eye alignment may be determined via alignment tracker 230 (e.g., gross alignment tracking of the pupil or iris) and/or with image sensor 210 (e.g., fine alignment tracking of retina 275).

While controller 215 is tracking eye alignment and searching for acceptable alignment within a threshold amount and/or for a threshold period of time (decision block 420), multiband illuminator 300 is illuminating eye 270 and retina 275 with distinct illumination bands substantially devoid of green visible light, such as illumination bands 305B-F (process block 415). If eye alignment has not yet been achieved (decision block 420) and the physical illumination pattern is intended to be a static pattern (decision block 425), then a burst of retinal images are acquired (process block 430). These images may be acquired at a relatively high frame rate (e.g., 30 frames/sec) until alignment is achieved and/or until a fixed number of images have been acquired, for a fixed period of time, or based upon other determining factors.

On the other hand, the eye alignment tracking (process block 410) may be used by controller 215 to dynamically adjust the physical illumination pattern to ease eye alignment (decision block 420). If dynamic adjustments to the illumination pattern are enabled (decision block 425), then the illumination pattern and/or wavelength bands are adjusted (process block 435) and the retinal images acquired in process block 440. The illumination pattern may be adjusted by changing the physical location of which discrete illumination sources 305 are enabled at a given time. For example, FIG. 3 illustrates how each discrete illumination source type has multiple instances in different locations. Additionally, the dynamic adjustments performed in process block 435 may also include sequential changes to different combinations of illumination bands. For example, discrete illumination sources 305B may be enabled first, followed sequentially by discrete illumination sources 305C, D, E, and F. Alternatively, various groups or combinations of the different wavelength bands substantially devoid of green visible light may be enabled in various sequential orders. For example, all discrete illumination sources 305B-F may be simultaneously enabled. Accordingly, various combinations of illumination may be sequentially cycled through while burst imaging in process block 440.

Returning to decision block 420, once eye alignment has been achieved, process 400 continues to a process block 445 where retina 275 is flashed with white light illumination. The white light may be a discrete white light source (not illustrated) or a contemporaneous flashing of red light (source 305c), green light (source 305A), and blue light (source 305B).

Once all multiband images substantially devoid of green visible light and/or full color images (based upon white light illumination) have been acquired, controller 215 may use various stacking, stitching, or binning algorithms to combine one or more images into one or more composite images (process block 450). For example, the multiband images substantially devoid of green visible light may be converted to RGB false color images for analysis by a human or computer algorithm (e.g., ML classifier 216). For example, the five distinct illumination bands (e.g., distinct wavelength bands including the following wavelengths: 400 nm, 700 nm, 800 nm, 900 nm, and 950 nm) may be converted using into an RGB false color image. In one embodiment, this conversion may be achieved using a neural network trained using full color RGB images associated with the multiband images acquired with the distinct illumination bands substantially devoid of green visible light. This training dataset may then be used to train the neural network to map the five band multiband images into regular RGB images for viewing.

In a process block 455, the acquired multiband images, full color images, and/or composite/converted images may be analyzed to identify diseases and classify whether any of the retinal images are symptomatic of one or more diseases. In one embodiment, the retinal images may be analyzed by a human (e.g., doctor, technician, etc.). In other embodiments, the retinal images may be analyzed by a computer algorithm, such as ML classifier 216. For example, the ML classifier may be a neural network trained with labeled image data acquired with a plurality of distinct illumination bands substantially devoid of green visible light. In other words, retinal imaging system 200 may be used to acquire a number of reference retinal images, some images solely acquired with distinct illumination bands substantially devoid of green visible light (e.g., using illumination sources 305B-305F), some including white illumination (e.g., sources 305A-C), and some with various different combination of illumination (e.g., any of sources 305). These images may be acquired from a population of retinas having known diseases and thus labeled as such. This labeled dataset may then be used to train ML classifier 216 to identify such diseases in future images.

Finally, in a process block 460, controller 215 outputs the retinal images, composite images, and/or a diagnosis report based upon the analyzing.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A retinal imaging system, comprising:
    an image sensor adapted to acquire one or more retinal images;
    a multiband illuminator positioned relative to the image sensor for illuminating a retina while the image sensor acquires the one or more retinal images, the multiband illuminator configured to generate a plurality of distinct illumination bands including visible light wavelengths substantially devoid of green visible light; and
    a controller coupled to the image sensor and the multiband illuminator, the controller including logic that when executed by the controller causes the retinal imaging system to perform operations including:
        illuminating the retina with the distinct illumination bands that include the visible light wavelengths substantially devoid of the green visible light while substantially not illuminating the retina with the green visible light; and
        acquiring a first retinal image of the one or more retinal images with the image sensor while illuminating the retina with the distinct illumination bands that include the visible light wavelengths substantially devoid of the green visible light and substantially not illuminating the retina with the green visible light.

2. The retinal imaging system of claim 1, wherein the controller includes further logic that when executed by the controller causes the retinal imaging system to perform additional operations comprising:
    sequentially acquiring a burst of retinal images including the first retinal image while illuminating the retina with the distinct illumination bands that do not include the green visible light.

3. The retinal imaging system of claim 2, wherein the controller includes further logic that when executed by the controller causes the retinal imaging system to perform additional operations comprising:
    after acquiring the burst of retinal images substantially devoid of illumination with the green visible light, flashing the retina with white light, including the green visible light; and
    acquiring a full color image while flash illuminating the retina with the white light to acquire a dataset including a plurality of multiband images substantially devoid of the green visible light and the full color image including the green visible light.

4. The retinal imaging system of claim 3, wherein both illuminating the retina with the distinct illumination bands substantially devoid of the green visible light and acquiring the burst of retinal images are executed during an alignment period when the retinal imaging system is not yet deemed by the controller to have achieved alignment with the retina and flash illuminating of the retina with the white light and acquiring the full color image are executed after alignment is deemed to have been achieved.

5. The retinal imaging system of claim 1, wherein the plurality of distinct illumination bands comprises five distinct illumination bands substantially devoid of the green visible light.

6. The retinal imaging system of claim 5, wherein the five distinct illumination bands comprise:
    a first band including a 400 nm wavelength;
    a second band including a 700 nm wavelength;
    a third band including a 800 nm wavelength;
    a fourth band including a 900 nm wavelength; and
    a fifth band including a 950 nm wavelength.

7. The retinal imaging system of claim 5, wherein the multiband illuminator comprises:
    a plurality of discrete illuminator sources spread peripherally around a central aperture through which the image sensor images the retina, the plurality of discrete illuminator sources each configured to generate a corresponding one of the five distinct illumination bands.

8. The retinal imaging system of claim 5, wherein the controller includes further logic that when executed by the controller causes the retinal imaging system to perform additional operations comprising:
    converting the first retinal image acquired with the five distinct illumination bands to an RGB false color image.

9. The retinal imaging system of claim 8, wherein the RGB false color image is converted using a neural network trained using full color RGB images associated with multiband images acquired with the distinct illumination bands substantially devoid of the green visible light.

10. The retinal imaging system of claim 1, further comprising:
    a machine learning (ML) classifier coupled to receive the first retinal image and classify whether the first retinal image is symptomatic of one or more of a plurality of diseases, the ML classifier including a neural network trained with labeled image data acquired with the plurality of distinct illumination bands substantially devoid of the green visible light.

* * * * *